United States Patent
Pierson et al.

(10) Patent No.: US 7,939,163 B2
(45) Date of Patent: *May 10, 2011

(54) DECORATIVE LAMINATE WITH GRAFFITI RESISTANCE AND IMPROVED COMBUSTION REACTION PROPERTIES

(75) Inventors: Robert G. Pierson, Akron, OH (US); Dale Onderak, Kent, OH (US); Mark D. Tennant, Cuyahoga Falls, OH (US)

(73) Assignee: Schneller LLC, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/587,703

(22) PCT Filed: May 3, 2005

(86) PCT No.: PCT/US2005/015282
§ 371 (c)(1),
(2), (4) Date: May 14, 2008

(87) PCT Pub. No.: WO2005/108062
PCT Pub. Date: Nov. 17, 2005

(65) Prior Publication Data
US 2008/0233365 A1 Sep. 25, 2008

(51) Int. Cl.
*B32B 7/02* (2006.01)

(52) U.S. Cl. ......... 428/212; 428/98; 428/109; 428/141; 428/147; 428/159; 428/172; 428/200; 428/204; 428/206; 428/215; 428/421

(58) Field of Classification Search ............... 428/195.1, 428/98, 109, 141, 147, 159, 172, 200, 204, 428/206, 215, 421, 212
See application file for complete search history.

(56) References Cited

U.S. PATENT DOCUMENTS

| | | | | |
|---|---|---|---|---|
| 4,686,135 A | * | 8/1987 | Obayashi et al. | 442/94 |
| 5,976,671 A | * | 11/1999 | Gleim | 428/172 |
| 6,265,082 B1 | * | 7/2001 | Dunham et al. | 428/500 |
| 6,803,090 B2 | * | 10/2004 | Castiglione et al. | 428/172 |
| 2004/0076828 A1 | * | 4/2004 | Pierson et al. | 428/411.1 |

FOREIGN PATENT DOCUMENTS

EP 304214 A * 2/1989

* cited by examiner

*Primary Examiner* — David R Sample
*Assistant Examiner* — Lawrence D Ferguson
(74) *Attorney, Agent, or Firm* — Roetzel & Andréss

(57) ABSTRACT

A decorative laminate (10) includes a polymer or engineered film with fluorine (100), a decorative pattern (20) visible through the polymer film (100), and a substrate (200) supporting the polymer film (100) and decorative pattern (20). An embossing layer (70) may be included between the polymer film (100) and substrate (200). The embossing layer (70) or substrate (200) or both may contain one or more fire retardant materials such as halogens. The decorative laminate (10) has a resistance to sustained ignition rated as at least M1 according to French Epiradiateur Test NFP 92-501, and a smoke index value of 80 or less, a classification of F3 or better according to French standard NF F-16-101 based on French Tests NF X 70-100 and NF X 10-702, and a resistance to graffiti in a range of G0-G1 as measured by French Graffiti test NF F 31-112.

19 Claims, 1 Drawing Sheet

DECORATIVE LAMINATE WITH GRAFFITI RESISTANCE AND IMPROVED COMBUSTION REACTION PROPERTIES

FIELD OF THE INVENTION

The present invention pertains generally to laminate structures with decorative features including textures and print patterns that can be thermoformed onto three-dimensional surfaces. Further, these would exhibit low combustion toxicity, low smoke and low flammability characteristics, while maintaining at least one surface that exhibits enhanced color stability, chemical resistance, durability, and cleanability.

BACKGROUND OF THE INVENTION

Structural panels used in architectural and passenger-vehicle applications are commonly covered with a decorative laminate. Decorative laminates used in such applications are typically constructed from a first layer adhered to a second layer. The first layer includes an exterior surface that is exposed to occupants of the area enclosed by the structural panels and through which a decorative pattern is visible. Therefore, the laminate must have suitable aesthetic characteristics, and physical characteristics to be formed three-dimensionally and stand up against wear and abrasion, and to resist soiling and adherence of ink or paint graffiti. To prevent damage to the decorative pattern due to abrasive or corrosive cleaning materials or acts of vandalism such as graffiti, the decorative pattern is disposed internally of an outer exterior surface of the first layer. The first layer can include materials that form an exterior surface that can be cleaned and is resistant to cleaning compounds. Fluropolymers such as Tedlar® from DuPont are well known by those knowledgeable in the art of decorative transportation laminates for their suitability as a first layer. These materials of the prior art include high concentration of halogenated compounds and can emit toxic gasses and opaque smoke when burned which will not pass regulations in some countries for use in underground tunnels. Another type of decorative interior panel includes a fiber glass reinforcement layer for strength and fire resistance, but has the disadvantages of higher weight and gauge thickness, higher cost and difficulty of three-dimensional forming. Likewise, high pressure laminates such as Formica® may pass combustion related tests, but may not pass cleanability/anti-graffiti requirements and more importantly have limited usage due to their inability be formed in three dimensions and potential for cracking and scratching. Another example of prior art would be a laminate of Tedlar® on top of Lexan®. This option is not known to have passed the combustion tests and could be impractical to thermoform due to high temperatures required. Another alternative would be a polyetherimide such as GE's Ultem® product capped with Tedlar®. This combination possibly could pass the combustion and cleanability requirements but its costs are not economical, and extremely high forming temperatures do not allow it to be considered for most commercial rail interiors.

Inside passenger vehicles, rail cars, aircraft and other compartments or confined spaces, such decorative laminates applied to structural panels pose a safety risk in the event of a fire. A fire that engulfs a portion of the passenger vehicle can ignite conventional decorative laminates installed therein. Smoke emitted by a burning decorative laminate can obstruct the visibility within the passenger vehicle and make evacuation difficult.

Similarly, conventional decorative laminates typically include materials that can emit toxic gases when burned. Various agencies around the world have promulgated regulations that establish threshold amounts of these toxins that humans can be exposed to for a predetermined period of time without exhibiting significant adverse effects. Decorative laminates containing materials that emit toxins in amounts above the threshold limits of such regulations when burned are unsafe for use in passenger vehicles and other confined spaces that may be occupied by humans.

Accordingly, there is a need in the art for a decorative laminate that can be used within passenger vehicles as well as other confined spaces, which produces minimal amounts of smoke and toxic gases when burned, has a low burning rate, is readily cleanable (i.e., resistant to permanent staining), and has resistance to degradation by topically applied cleaning agents and abrasive materials.

It has been difficult in the industry to achieve decorative laminates having both suitable toxicity and flammability characteristics, while providing a durable decorative surface with color stability, and chemical resistance to stains and cleaning agents. While fire retarding additives lower the amount of heat release and flame spread, they also can produce additional smoke and toxic gases. Also fluoropolymers are well known to be durable, chemical and stain resistant cap films. Unfortunately, the Fluorine in these fluoropolymers produce additional toxic gases when burned. Adding other factors such as cost, weight, ease of handling, and formability, make the achievement of meeting all fire, smoke, toxicity and cleanability requirements a challenge.

SUMMARY OF THE INVENTION

In accordance with one aspect, the present invention provides a decorative laminate made of two or more layers of engineered films, which has improved combustion reaction properties of fire retardance and reduced smoke toxicity, and resistance to graffiti markings and cleaning agents. The decorative laminate includes a polymer film with a decorative pattern visible through the first polymer film, and a substrate supporting said first polymer film and said decorative pattern. The decorative laminate has a resistance to sustained ignition rated as at least M1 according to French Epiradiateur Test NFP 92-501, and a smoke index value of 80 or less as required to achieve a classification of F3 or better according to French standard NF F-16-101 based on French Tests NF X 70-100 and NF X 10-702.

In accordance with another aspect, the present invention provides a decorative laminate formed by a process which includes the steps of providing a substrate and a polymer film, wherein at least one of the substrate and the polymer film has a flame retarding component; and balancing a concentration of the flame retarding component in the substrate and the polymer film to provide the decorative laminate with an aggregate resistance to sustained ignition rated as at least M1 (on a scale of, for example, M0 to M4) according to French Epiradiateur Test NFP 92-501 and a smoke index value of 40 or less to achieve a classification of F0-F3 (also referred to herein as "F3 or better") according to French standard NF F-16-101 based on French Tests NF X 70-100 and NF X 10-702. The polymer film has a resistance to graffiti rating in a range of G0-G1 as measured by French Graffiti test NF F 31-112. In a preferred embodiment, the polymer film contains fluorine for resistance to graffiti markings, and which is impervious to cleaning agents.

In accordance with another aspect of the invention, a decorative laminate is provided which has an outer polymer film layer, a decorative pattern or layer visible through the polymer film, one or more embossing layers which are able to be textured, and a substrate which is formable in three-dimensional configurations, and which contributes to the fire retardant properties of the decorative laminate. The decorative laminate has a resistance to sustained ignition rated as at least M1 according to French Epiradiateur Test NFP 92-501, and a smoke index value of 80 or less as required to achieve a classification of F3 or better according to French standard NF F-16-101 based on French Tests NF X 70-100 and NF X 10-702, and a resistance to graffiti rating in a range of G0-G1 as measured by French Graffiti test NF F 31-112.

These and other aspects, attributes and advantages of the invention are described herein in detail with reference to the accompanying Figures.

DETAILED DESCRIPTION OF PREFERRED AND ALTERNATE EMBODIMENTS OF THE INVENTION

Figure 1:
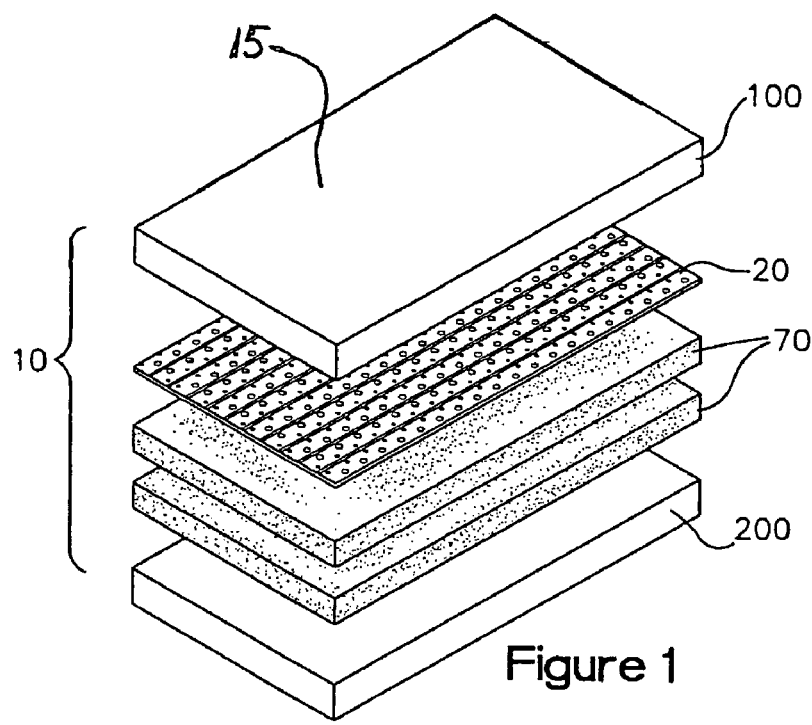
FIG. 1 is an exploded view illustrating an exemplary embodiment of a decorative laminate in accordance with the present invention.
Figure 2:
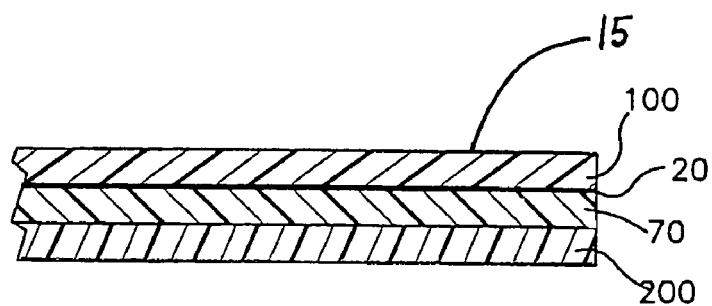
FIG. 2 is a side view of a decorative laminate in accordance with an embodiment of the present invention.

FIG. 1 is an exploded view of a laminate 10 (also referred to herein as a "decorative laminate") in accordance with an embodiment of the present invention. As shown in FIG. 1, the decorative laminate 10 includes a polymer film 100 as one layer of the laminate. The polymer film 100 is preferably resistant to graffiti type markings, by having an outer surface which is impervious to cleaning agents. It may also have the ability to accept a texture pattern, and may also have a flame or fire retarding component. In a preferred embodiment, the polymer film 100 contains fluorine (i.e. is fluorinated) which gives the film the property of resistance to marking agents such as inks and paints. A decorative pattern layer 20 may be positioned behind the polymer film 100 so as to be visible through the polymer film 100. A substrate 200 is provided adjacent to the polymer film 100. At least one of the layers of the polymer film 100 or substrate 200 may contain one or more additives which give desired properties such as fire retardance, reduced smoke toxicity, and resistance to graffiti markings and to cleaning agents. Films and layers with such additives and resultant properties, which can be cast, calendered, extruded or blown, are also referred to herein as "engineered films". The laminate 10 has a resistance to ignition and sustained combustion rated as at least M1 (on a scale of, for example, M0-M4) according to French Epiradiateur Test NFP 92-501, and a smoke index value of 80 or less as required to achieve a classification of F0, F1, F2 or F3 ("F3 or better"), according to French standard NF F-16-101 based on French Tests NF X 70-100 and NF X 10-702, all of said tests being incorporated in their entirety by reference herein, and referred to (collectively as the "AFNOR Standards"). As used herein, "F3 or better" refers to and includes classifications F0, F1, F2 and/or F3 for smoke toxicity as defined by the test standards, wherein the F rating is a smoke toxicity index. As described, the preferred properties of the first polymer film, as a component of the decorative laminate 10, are color fastness, opacity, low toxicity, low flammability and low smoke.

The AFNOR Standards characterize materials according to their fire behavior with regard to reaction to fire, opacity of smoke and toxicity of gases emitted. With respect to toxicity, toxicity may be measured with respect to critical concentrations, which are expressed in milligrams of toxins per cubic meter. A critical concentration of such gases is the maximum concentration which an individual is capable of withstanding for fifteen minutes without irreversible biological effects, as set forth in TABLE 1 below.

TABLE 1

| Gas | C.C. ($mg/m^3$) |
|-----|-----------------|
| CO  | 1,750 |
| $CO_2$ | 90,000 |
| HCl | 150 |
| HBr | 170 |
| HCN | 55 |
| HF  | 17 |
| $SO_2$ | 260 |

Materials, such as the decorative laminate 10 of this invention, are classified by their smoke index as determined by the formulae recited in the AFNOR Standards. The AFNOR Standard's smoke index is calculated from the value of the maximum specific optical density, the value of obscuration and the value of the conventional index of toxicity, which are values obtained from the examination of smoke in accordance with the requirements set forth in clauses 6.2 and 6.3 of the applicable AFNOR Standard. Under the AFNOR Standards, smoke index results in toxicity are expressed in one of six classes, as set forth in TABLE 2 below.

TABLE 2

| Class | Value of I.F. |
|-------|---------------|
| F0    | <5 |
| F1    | <20 |
| F2    | <40 |
| F3    | <80 |
| F4    | <120 |
| F5    | >120 |

The polymer film 100 is preferably an organic polymer which contains a halogen, halogenated compound, halogen derivative or combination thereof, and which preferably contains fluorine. Examples of other suitable flame retarding components include, but are not limited to, polyvinyl fluoride (PVF) (such as Tedlar®), polyvinylidene fluoride (PVDF) (such as Kynar®), polyvinyl chloride (PVC), ethylene tetrafluoroethylene (ETFE) (such as Tefzel®), chlorotrifluoro ethylene (as sold under the trade name ACLAR™) and Teflon® variations such as fluorinated ethylene propylene (FEP) and perfluoroalkoxy copolymer (PFA) or the like. A preferred commercially available polymer film 100 is made from an unoriented, polyvinyl-fluoride film marketed under the tradename Tedlar® SP PVF by E.I. du Pont de Nemours of Wilmington, Del. Tedlar® SP PVF, similar to other polymer films, includes a halogenated component, which provides the decorative laminate 10 with an externally exposed surface 15 which has enhanced color stability, chemical/cleaner resistance, and durability. One embodiment of the present invention contemplates a polymer film 100 having a thickness in a range of about 0.0001 in. to about 0.01 in. By contrast, a standard laminate containing 2 mils of Tedlar® PVF has an M1 combustion rating and an F4 classification for smoke index according to the referenced French tests. The F4 classification exceeds the maximum allowed for certain installations, such as rail car interiors intended for underground service, according to the described test standards.

The polymer film 100 is also referred to generally herein as an "engineered film" or "engineered films", which can be any of the above-described materials and further includes without limitation any type of polymer, copolymer or polymer blend with or without additives that can be cast, calendered, extruded or blown into a sheet or film that has been produced in a controlled process to give desired properties such as: fire retardance, graffiti resistance, reduced smoke toxicity, ability to hold texture and be formed, heat and or light stability, tensile strength, impact resistance, etc., further examples including but not limited to acrylic, polyester, polycarbonate, polyurethane, polyamide, ABS, PETG, silicone, PVF, PVDF and PVC. As defined herein, one or more engineered films of the same or different types may be used in any of the layers of the described laminate structures of the various embodiments of the invention.

When the decorative laminate 10 of the invention is installed on a wall panel or other surface or structure, the externally exposed surface 15 is oriented to face away from the wall panel, and is the outermost surface of the laminate, located on an opposite side of the substrate 200 from the wall panel. When the decorative laminate 10 is installed on interior walls of a rail car of other passenger vehicle, for example, the externally exposed surface 15 will face the interior of the passenger compartment. By this arrangement, it is the exposed surface 15 of the laminate 10 which must be impervious to stains for good graffiti resistance and resistance to cleaning agents and mechanical abrasion.

Halogenated organic polymers are known to form surfaces having a low surface energy. Low surface energy means that the intermolecular forces between individual monomer units of the polymer film 100 are stronger than forces between the polymer film 100 and a liquid in contact with the polymer film 100. When surface tension of the liquid, which is a measure of the intermolecular attraction of the individual liquid molecules to each other, is stronger than the surface energy of the polymer film 100, wetting of the externally exposed surface 15 by the liquid is minimized, thereby facilitating removal of the liquid from the externally exposed surface 15. It is believed that the low surface energy of the polymer film 100 is due in part to the stability of the carbon-halogen bond, and thus, to its resistance to reaction with other materials such as inks, paints, and its chemical resistance to solvents such as cleaning agents. Due to this resistance to reaction with inks and paints, which are commonly used to create graffiti on the walls of public facilities, such markings made on the externally exposed surface 15 can be removed with the aid of a cleaning agent, which, as mentioned above, also does not damage or otherwise degrade the decorative laminate 10, due in part to the chemical resistance of the polymer film 100 attributable to the halogen and preferable fluorine content. To provide the lowest possible surface energy while minimizing the concentration of the flame retarding component within the polymer film 100, a flame retarding component can optionally be provided primarily at the externally exposed surface 15 of the decorative laminate 10. Also within the scope of the invention is the use of multi-layer/multi-component extrusion films as one or more layers, such as polymer film layer 100, of the decorative laminate 10. Such hybrid films have, for example, a 1 mil PVC layer combined with 0.1 or 0.2 mil layer of fluorinated PVC, or a 1 mil acrylic film with a 0.1-0.2 mil fluoropolymer rich cap such as PVDF, or other polymer for cleanability and fire retardant properties. Such hybrid co-extruded films, which may contain a thin fluorinated layer, are now commercially available from Saint-Gobain Performance Plastics.

The substrate 200 can suitably be one or more of the materials selected from a group consisting of an acrylic, a polyester, a polycarbonate, and any other material that can support the decorative pattern 20 and the polymer film 100, and which can be formed in three-dimensional configurations. For example, the substrate can include an acrylic such as that marketed under the tradename Korad™. The substrate 200 is chosen using sound engineering judgment to provide mass, formability and structural qualities desired of the decorative laminate 10. The substrate 200 can contain a halogen, halogenated compound, halogen derivative, and any combination thereof, and can also be substantially devoid of any of the aforementioned halogenated materials. Further, the substrate 200 can have any suitable dimensions, however, a preferred embodiment includes a substrate 200 having a thickness within a range of about 0.0005 in. to about 0.04 in. When the decorative laminate 10 is assembled, the substrate 200 lies in a plane that is generally adjacent and parallel to polymer film 100.

Though not necessary to the present invention, one or more intermediate embossing-resin layers 70 may be provided between the polymer film 100 and the substrate 200, preferably arranged coplanar with the polymer film 100 and the substrate 200, and having a thickness within a range of about 0.0005 in. to about 0.04 in. (0.5 mil to 40 mils) The embossing resin 70 provides additional thickness to the laminate 10, and can optionally accept an embossed texture applied through layer 100. The embossing resin 70 is any suitable thermoplastic or thermosetting resin, cast, calendared or extruded, which functions to bond the polymer film 100 to the substrate 200, and provides a depth dimension to the decorative laminate 10 which accepts and retains an embossed texture, while not adversely affecting the flammability or toxicity the resulting laminate. Preferably, the embossing layer 70 is a PVC with one or more additives which are fire retardant. The preferred Korad material for the embossing layer 70 also has the desirable properties of color fastness, opacity, and relatively lower levels of toxicity, flammability and smoke production as compared to other available materials which could be used as a substrate of a laminate.

The decorative laminate 10 according to the present invention is designed to achieve resistance to sustained ignition by balancing the aggregate amount of flame retarding component present in the decorative laminate 10 without detrimentally affecting the combustion toxicity characteristics of the decorative laminate 10. Selection of the polymer film 100, substrate 200, and embossing resin 70 is be made in accordance with the principles of the invention by taking into account the respective masses of the various materials, respective concentrations of flame retarding components, and other physical and chemical properties of each of the materials. For example, balancing the concentration of the flame retarding component can include varying the thickness of the polymer film 100 and substrate 200 with the flame retarding component inversely proportional to a concentration of the flame retarding component in the polymer film 100 and substrate 200. Accordingly, the higher the concentration of the flame retarding component in the polymer film 100 and the substrate 200, the smaller their respective thicknesses will be. Alternatively, increasing the amount of flame-retarding component in the polymer film 100 is balanced by reducing the amount of flame-retarding component in the substrate 200.

The intermediate layers 70 may or may not materially positively affect the toxicity or the flammability characteristics of the decorative laminate 10, but do provide a means for application and retention of an embossed design to the decorative laminate 10. A preferred embodiment of the invention, however, has intermediate layers 70 which do positively affect toxicity and/or flammability characteristics of a laminate structure. As described, the polymer film 100 and the substrate 200 are selected, in both size and concentration of the flame retarding component, to provide the aggregate decorative laminate 10 with a resistance to sustained ignition rated at least M1 according to French Epiradiateur Test NFP 92-501, and a smoke index value of 80 or less as required to achieve a classification of F1, F2 or F3 according to French standard NF F-16-101 based on French Tests NF X 70-100 and NF X 10-702. A preferred embodiment of the present invention includes a polymer film 100 with a thickness of about 0.0005 in., a substrate 200 having a thickness of about 0.0020 in., and an embossing layer 70 having a thickness of about 0.0045 in., however, the embossing resin can have any thickness, including a thickness within a range of about 0.0005 in. (0.5 mil) to about 0.04 in. (40 mils).

The following examples of alternate embodiments of decorative laminates constructed in accordance with the present invention are provided as further disclosure of an exemplary embodiments and do not otherwise limit the scope of the invention.

EXAMPLE 1

A decorative laminate 10 as described above was formed with a 0.0005 in. (0.5 mil) polymer film as layer 100, specifically in the form of non-oriented Tedlar® SP, Type 8, and laminated with 4.5 mil layer of embossing resin 70, preferably a PVC blend with non-halogen fire-retardants, color pigments, and a 2.0 mil layer of Korad acrylic as the substrate 200.

Test samples of the decorative laminate 10 were prepared to determine the flammability and toxicity characteristics of a decorative laminate 10 so formed. Each test sample had an overall density of 275 g/m² and was bonded to an aluminum sheet with a fire retardant grade "PS GT" precast pressure sensitive adhesive film having a density of between 90 and 110 g/m². The samples were also conditioned to a constant mass at a temperature of 23±3° C. and a relative humidity of 50±10%.

A test was performed in accordance with the procedure specified in NFP 92-501, which is incorporated by reference in its entirety herein. The results of this test revealed that decorative laminate had a resistance to sustained ignition rated as M1, a smoke index of 80 or less, a smoke index rating of F3 or better, and a resistance to graffiti rating in a range of G0-G1 as measured by French Graffiti test NF F 31-112.

EXAMPLE 2

A decorative laminate 10 was formed with a 0.0005 in. (0.5 mil) polymer film as layer 100, specifically in the form of non-oriented Tedlar® SP, Type 8, and laminated with 6.5 mil layer of embossing resin 70, preferably a PVC blend with non-halogen fire retardants and color pigments. A sufficient amount of fire retardant material in the layer 70 of embossing resin, of increased thickness in comparison to the laminate of EXAMPLE 1, indicates satisfactory performance under the applicable sustained ignition and smoke index test standards and graffiti resistance rating.

EXAMPLE 3

A decorative laminate 10 as described above was formed with a 0.0005 in. (0.5 mil) polymer film as layer 100, specifically in the form of non-oriented Tedlar® SP, Type 8, and laminated with 4.5 mil layer of embossing resin 70, preferably a PVC blend containing halogen and non-halogen containing fire-retardants, color pigments, and a 2.0 mil layer of PVC as the substrate 200.

Test samples of the decorative laminate 10 were prepared to determine the flammability and toxicity characteristics of a decorative laminate 10 so formed. Each test sample had an overall density of approximately 275 g/m² and was bonded to an aluminum sheet with a fire retardant grade "PS GT" precast pressure sensitive adhesive film having a density of between 90 and 110 g/m². The samples were also conditioned to a constant mass at a temperature of 23±3° C. and a relative humidity of 50±10%.

A test was performed in accordance with the procedure specified in NFP 92-501, which is incorporated by reference in its entirety herein. The results of this test revealed that decorative laminate had a resistance to sustained ignition rated as M1, a smoke index of 80 or less, a smoke index rating of F3 or better, and a resistance to graffiti rating in a range of G0-G1 as measured by French Graffiti test NF F 31-112.

EXAMPLE 4

A decorative laminate 10 was formed with a 0.0005 in. (0.5 mil) polymer film as layer 100, specifically in the form of non-oriented Tedlar® SP, Type 8, and laminated with 6.5 mil layer of a PVC/acrylic blend containing halogen and non-halogen containing fire-retardants. This embodiment essentially combines the embossing resin layer 70 with the substrate 200 to the combined thickness of 6.5 mils, and has substantially similar performance characteristics as the laminate of EXAMPLE 1 under the applicable tests.

EXAMPLE 5

A decorative laminate 10 as described above was formed with a 0.0005 in. (0.5 mil) polymer film as layer 100, specifically in the form of non-oriented Tedlar® SP, Type 8, and laminated with 4.5 mil layer of embossing resin 70, preferably a PVC blend containing halogen and non-halogen containing fire-retardants, color pigments, and a 3.0 mil layer of polyethylene terphtalate glycol copolyester (PETG) as the substrate 200.

This embodiment of the laminate 10 also demonstrates satisfactory performance in accordance with the procedure specified in the NFP 92-501 test, with resistance to sustained ignition rated as M1, a smoke index of 80 or less, and a smoke index rating of F3 or better, and a resistance to graffiti rating in a range of G0-G1 as measured by French Graffiti test NF F 31-112.

EXAMPLE 6

A decorative laminate 10 as described above was formed with a 0.0004 in. (0.4 mil) polymer film as layer 100, specifically in the form of PVDF film, and laminated with 4.5 mil layer of embossing resin 70, preferably a PVC blend containing halogen and non-halogen containing fire-retardants, color pigments, and a 2.0 mil layer of acrylic such as Korad® as the substrate 200.

This embodiment of the laminate 10 would produce satisfactory performance in accordance with the procedure specified in the NFP 92-501 test, with resistance to sustained ignition rated as M1, a smoke index of 80 or less, and a smoke index rating of F3 or better, and a resistance to graffiti rating in a range of G0-G4 as measured by French Graffiti test NF F 31-112.

EXAMPLE 7

A decorative laminate 10 as described above was formed with a 0.0005 in. (0.5 mil) polymer film as layer 100, specifically in the form of ETFE film, and more specifically in the form of a DuPont product sold as Tefzel® and laminated with 4.5 mil layer of embossing resin 70, preferably a PVC blend containing halogen and non-halogen containing fire-retardants, color pigments, and a 2.0 mil layer of acrylic, such as Korad®, as the substrate 200.

This embodiment of the laminate 10 demonstrated superior performance in accordance with the procedure specified in the NFP 92-501 test, with resistance to sustained ignition rated as M1, a smoke index of 20 or less—corresponding to a smoke index rating of F1, and a resistance to graffiti rating of G0 as measured by French Graffiti test NF F 31-112.

EXAMPLE 8

A decorative laminate 10 as described above was formed with a two co-extruded multi-layer polymer films as opposed outer layers 100, each having a first 1.0 mil layer of PVDF film, a 0.8 mil layer of PVDF/acrylic blend, and another 0.1 mil layer of PVDF film, and a 4.5 mil layer of embossing resin 70 (preferably a PVC blend containing halogen and non-halogen containing fire-retardants, color pigments) between the two outer co-extruded polymer film layers.

The co-extruded outer polymer film layers 100 have a concentration of fluorine at the surface which enhances the graffiti resistance of the decorative laminate. The back polymer film layer 100 can also be pigmented for aesthetics, and/or can alternatively be made of 2.0 mils of acrylic, without foregoing the advantage of the fluorine concentration at the exposed surface of the decorative laminate.

EXAMPLE 9

A decorative laminate 10 as described above was formed with a (1.0 mil) polymer film as layer 100, specifically in the form of non-oriented Tedlar SP®Y, Type 8, and laminated with 6.75 mil layer of embossing resin 70, preferably a PVC blend containing halogen and non-halogen containing fire-retardants, color pigments, and a 3.0 mil layer of acrylic as the substrate 200.

This embodiment of the laminate 10 is an example of the balancing principle of the invention of the relative thicknesses of the layers of the laminate to produce satisfactory performance in accordance with the NFP 92-501 test, with resistance to sustained ignition rated as M1, a smoke index of 80 or less, and a smoke index rating of F3 or better, and a resistance to graffiti rating in a range of G0-G1 as measured by French Graffiti test NF F 31-112. For applications where a thicker overall laminate is required or desired, the polymer film outer layer can be made proportionately thicker to remain in balance with a thicker substrate and intermediate or embossing layer.

What is claimed as the invention is:

1. A fire retardant and graffiti resistant laminate, comprising:
a polymer film layer containing fluorine;
an embossing layer containing PVC and at least one additional fire retardant material and
a substrate further comprising a fire retardant,
wherein the laminate has a resistance to sustained ignition rated as at least M1 according to French Epiradiateur Test NFP 92-501, and a smoke index value of 80 or less as required to achieve a classification of F3 or better according to French standard NF F-16-101 based on French Tests NF X 70-100 and NF X 10-702, and has a resistance to graffiti rating in a range of G0-G1 as measured by French Graffiti test NF F 31-112.

2. The laminate of claim 1 wherein the polymer film layer is Tedlar® SP polyvinyl fluoride.

3. The laminate of claim 1 wherein the fluorine in the polymer film layer is present at an exposed surface of the polymer film layer.

4. The laminate of claim 1 wherein the polymer film layer has a thickness in an approximate range of 0.5 mil to 2 mils.

5. The laminate of claim 1 wherein the polymer film layer is PVDF.

6. The laminate of claim 1 wherein the polymer film layer is ETFE.

7. The laminate of claim 1 wherein the polymer film layer is a blend of PVDF and acrylic.

8. The laminate of claim 1 wherein the polymer film layer is a co-extruded blend of materials which includes acrylic.

9. The laminate of claim 1 wherein the embossing layer contains a fire retardant material selected from the group consisting of antimony oxide, zinc borate, aluminum tri-hydrate, magnesium hydroxide and phosphates.

10. The laminate of claim 1 wherein the embossing layer has a thickness in an approximate range of 0.5 mils to 40 mils.

11. The laminate of claim 1 wherein the embossing layer is textured.

12. The laminate of claim 1 wherein the substrate contains acrylic.

13. The laminate of claim 1 wherein the substrate contains PVC.

14. The laminate of claim 1 wherein the substrate contains acrylic and PVC.

15. The laminate of claim 1 wherein the substrate contains PETG.

16. The laminate of claim 1 wherein the substrate contains acrylic and PVDF.

17. The laminate of claim 1 wherein the substrate has a thickness in an approximate range of 1.0 mil to 7.0 mil.

18. The laminate of claim 1 further comprising a pressure sensitive adhesive on the substrate.

19. The laminate of claim 1 further comprising a heat activated adhesive on the substrate.

* * * * *